United States Patent

[11] 3,558,894

| [72] | Inventors | Giovanni Odone |
| | | La Rosiaz, Lausanne; |
| | | Jesus DeAndres; Virgilio Cossetta, |
| | | Yverdon, Switzerland |
| [21] | Appl. No. | 686,554 |
| [22] | Filed | Nov. 29, 1967 |
| [45] | Patented | Jan. 26, 1971 |
| [73] | Assignee | Paillard S. A. |
| | | Vaud, Switzerland |
| | | a company of Switzerland |
| [32] | Priority | Dec. 15, 1966 |
| [33] | | Switzerland |
| [31] | | 18117/66 |

[54] TELEMETER CHIEFLY INTENDED FOR PHOTOGRAPHIC PURPOSES
10 Claims, 3 Drawing Figs.

[52] U.S. Cl. .................................................. 250/216,
250/210, 250/235, 350/101, 350/294, 356/4
[51] Int. Cl. ...................................................... H01j 3/14
[50] Field of Search............................................. 95/44, 45,
44C; 88/1HF, 1U; 250/234, 235, 210, 217, 2.4;
350/101, 294; 356/4

[56] References Cited
UNITED STATES PATENTS

| 2,339,780 | 1/1944 | Huitt............................. | 95/44 |
| 2,490,052 | 12/1949 | Harris........................... | 350/294 |
| 2,968,994 | 1/1961 | Shurcliff....................... | 88/56 |
| 3,185,059 | 5/1965 | Durst............................ | 95/44 |
| 3,218,390 | 11/1965 | Bramley........................ | 350/294 |
| 3,218,909 | 11/1965 | Fain .............................. | 250/235 |
| 3,224,319 | 12/1965 | Robert .......................... | 88/1U |
| 3,333,105 | 7/1967 | Kossakowski................. | 250/210 |
| 3,336,851 | 8/1967 | Warshawsky.................. | 88/1HF |
| 2,897,722 | 8/1959 | Gunter, Jr. et al.............. | 250/204X |
| 3,385,159 | 6/1968 | Bliss et al...................... | 356/4 |

FOREIGN PATENTS

| 1,121,838 | 1/1962 | Germany....................... | 95/45 |
| 1,213,229 | 11/1963 | Germany....................... | 95/44 |
| 486,484 | 9/1952 | Canada ......................... | 356/4 |

OTHER REFERENCES

Horman, M., " The Determination of Atmospheric Transmissivity by Backscatter from a Pulsed Light Separated System," Armed Services Technical Information Agency, Doc. No. 243,930, Oct. 1958.

*Primary Examiner*—James W. Lawrence
*Assistant Examiner*—C. M. Leedom
*Attorney*—McGlew and Toren ABSTRACT: A compact telemeter measuring comparatively short distances, chiefly for photographic purposes, comprising a projector sending a beam of substantially parallel rays of light onto an object the distance of which is to be ascertained, an optical system receiving said beam after reflection on said object and the axis of which is directed in parallelism with the axis of the projector and means sensitive to the location of the point of convergence of the beam of light after it has passed through the optical system. Said means are advantageously constituted by two photocells lying on the axis of the optical system and the relative illumination of which depends on the location of said point of convergence along said axis. This relative illumination controls an electric circuit shifting the cells into a position of equal illumination defining the distance to be measured.

PATENTED JAN 26 1971
3,558,894
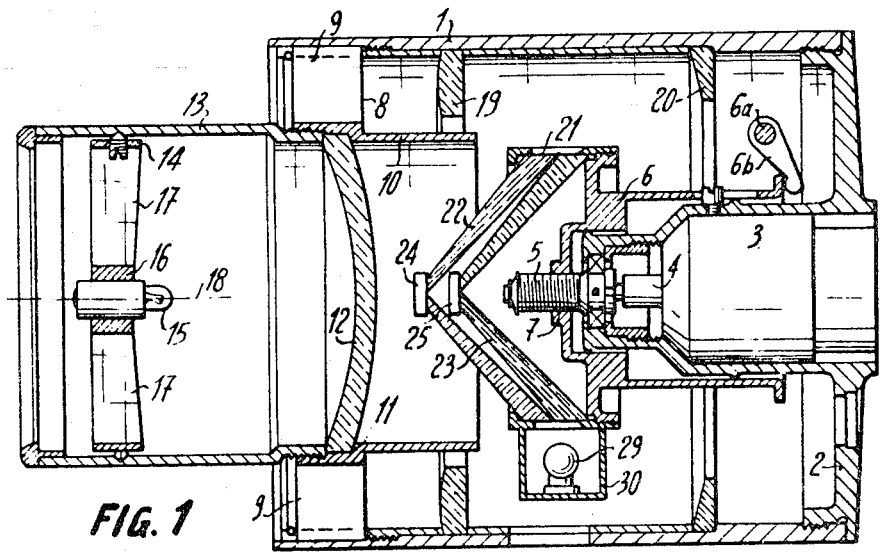
FIG. 1
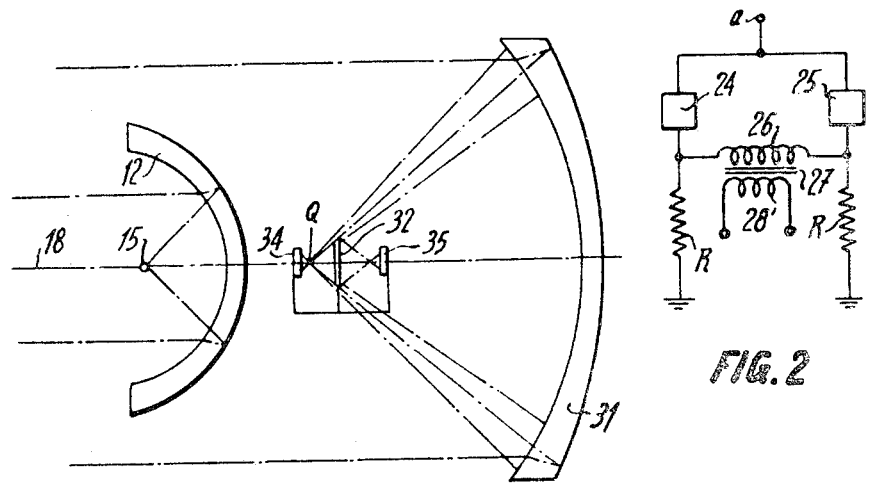
FIG. 3
FIG. 2
INVENTORS
GIOVANNI ODONE
JESUS DE ANDRES
VIRGILIO COSSETTA
BY
ATTORNEYS

TELEMETER CHIEFLY INTENDED FOR PHOTOGRAPHIC PURPOSES

The present invention has for its object a telemeter, chiefly intended for photographic purposes. Such a telemeter serves mainly for measuring comparatively short distances, generally less than about 10 meters.

Arrangements have already been proposed for measuring distances by means of infrared rays for instance. Such prior known arrangements are adapted for measuring comparatively large distances and their execution is based on the same principle as optical telemeters. In practice, the distances are measured by the angle within which a receiver collects infrared rays issuing from a source lying at a location remote from said receiver and reflected by the object of which it is desired to measure the distance.

The arrangements known hitherto allow measuring accurately comparatively long distances, of a magnitude of about several times 10 meters, but they are on the other hand bulky and require a comparatively considerable spacing between the receiver and the transmitter constituted by the source of infrared rays.

The present invention has now for its object a telemeter to be used chiefly for photographic purposes, which telemeter includes a projector supplying a narrow luminous beam and at least one convergent optical receiving system of which the optical axis is directed in substantial parallelism with that of the projector so as to collect the rays of the beam which are reflected by the object of which it is desired to measure the distance, while one or more devices are provided, which are sensitive to the distance at which the rays collected by the receiver converge.

The accompanying drawing illustrates diagrammatically and by way of example two embodiments of the invention. In said drawing:

FIG. 1 is a sectional view of a telemeter according to the first embodiment.

FIG. 2 is a wiring diagram for said embodiment.

FIG. 3 illustrates a second embodiment.

The telemeter illustrated in FIG. 1 is enclosed in a casing 1, the rear end of which is closed by a flange 2 screwed inside the body of the casing 1. Said flange 2 carries an electric motor 3 driving into rotation through its shaft 4 a screw 5. The latter engages a threaded opening 7 formed in a member 6 adapted to slide over the inwardly projecting portion of the flange 2, which encloses the motor 3. Said member 6 carries optical parts to be described in detail hereinafter.

The front end of the casing 1 is adapted to carry a ring 8 provided with an annular series of openings 9 which allow light to enter the casing 1. Said ring 8 includes an inwardly projecting cylindrical section 10 of a reduced diameter forming a shoulder or bearing surface 11 for a concave reflector 12. The latter is held in position by a coaxial tubular member 13 screwed into the ring 8 and enclosing a support 14 for a central sleeve 16 carrying a bulb 15. The rim of the support 14 is connected with the central sleeve 16 by radial arms 17 so that the bulb lies on the optical axis 18 of the reflector 12.

The luminous rays passing out of the bulb 15, of which the filament or the arc forms substantially a pin point, are reflected by the reflector 12 and through the front opening of the tubular member 13 in the shape of a beam the rays of which are parallel with the optical axis 18.

The bulb 15 and reflector 12 forms thus a projector supplying a compact beam directed towards the object of which it is desired to ascertain the distance with reference to the telemeter, which latter is generally associated with a photographic or kinematographic camera.

Preferably, the light supplied by the projector 12—15 is modulated at a comparatively low frequency, for instance of a magnitude of a few 10 cycles per second, so as to allow differentiating the luminous rays produced by the projector when reflected, from any parasitic luminous rays. Said modulation of the light may be obtained in a simple manner by successive interruptions of the current feeding the bulb 15, but obviously it is possible to resort also to other means, for instance to an electromagnetically energized vibratory blade extending in proximity with the bulb 15 across the path of the rays directed towards the reflector 12.

A fraction of the rays reflected by the distant object enters the casing 1 in the shape of an annular beam defined by the gap between said casing 1 and the tubular member 13. Said rays pass in fact through the openings 9 of the ring 8 and thence through an annular optical glass element 19. The latter shows on one side a substantially flat surface and on the other side a tore-shaped surface coaxial with the projector. It acts thus as a convergent cylindrical lens incurved so as to assume an annular shape.

When said element 19 receives the rays passing out of a luminous point located on the axis 18 of the optical system including the projector and the element 19, it produces a real image of said point in the shape of an annulus concentric with the element 19, the axial spacing between said element and said annular image depending of course on the distance between the luminous point and said element 19. When the luminous point is shifted along the optical axis 18, the real image of said point is constituted by a circle moving similarly along said axis 18 while its diameter increases as the point of convergence of the incoming rays moves further away to the rear of the element 19. Thus, the annular images corresponding to the different possible positions of the luminous point along the axis 18 move over a conical surface. On the other hand, the rays collected by the element 19 are received at the rear thereof by an annular mirror 20 in the shape of a frusto-cone the apical angle of which is selected in a manner such that the rays reflected by it converge onto a cylindrical surface 21, coaxial with the axis 18 and located between the planes defined by 19 and 20, the reflected rays impinging on said surface 21 whatever may be the distance separating the element 19 from the luminous point.

The cylindrical surface 21 is formed on two cones 22, 23 of a transparent material, carried by the adjustable member 6. The two cones 22, 23 form guides for the light received on the surface 21 and guide the light towards the corresponding photosensitive cells 24, 25 carried by their apices.

Thus, the point of convergence of the rays reflected by 20 onto the surface is shifted axially as a function of the distance of the object, the distance of which is to be measured. According to the distance of said object and to the position of the member 6 carrying the two cones 22 and 23, the intensity of the light collected by the cell 24 varies with reference to that of the light collected by the cell 25. Said difference in light intensity generates a difference between the electric conditions of the two cells, which latter difference may serve for controlling the motor 3 and causing it to rotate in a direction such that it shifts the member 6 with the cones 22 and 23 until the two cells 24 and 25 are subjected to equal luminous intensities.

To each distance between the object of which it is desired to ascertain the distance and the telemeter, there corresponds consequently a predetermined position for the member 6. Thus, the position of equal illumination for the cells 24 and 25 allows defining the distance of the object by noting the position of the member 6. Said distance may, for instance, be read by means of an index, not illustrated, actuated by a rod 6a carrying an arm 6b urged elastically into contact with the member 6. Said rod 6a may furthermore serve for the mechanical actuation of the ring controlling the adjustment of the ranges on a camera coupled with the telemeter described.

Obviously, the telemeter described can be operative only if at least one of the cells 24, 25 actually receives a fraction of the rays reflected by the object, the distance of which is to be measured. The cylindrical surface 21 should therefore have a length sufficient in a direction parallel with the optical axis 18 for one of the cells 24, 25 to be energized by the rays sent by the object into the telemeter, when the object lies at one limit of the range of measurements allowed by the telemeter, while the instantaneous adjustment of the member 6 corresponds to the opposite limit of said range.

If, for structural reasons, it is not possible to give the cylindrical surface 21 a sufficient length, for instance because it may be of interest to provide a very broad measuring range for the telemeter, the telemeter should be provided with a rough manual preliminary adjusting mechanism adapted to bring said surface 21 into a position where it may receive the light reflected by the distant object.

If the cylindrical surface 21 has a length sufficient for it to receive the rays reflected by the object throughout the range of measurements of the telemeter, it is of advantage to provide the latter with an arrangement for the automatic return to the infinite when neither of the two cells 24, 25 produces a signal corresponding to the reception of the reflected beam. As a matter of fact, if the object of which it is desired to ascertain the distance is too remote, the energy of the reflected luminous beam is too weak for it to make the cells 24, 25 produce a perceptible output signal. It is therefore of interest in such a case for the telemeter to indicate a very large distance which may be considered as equivalent to the infinite.

FIG. 2 illustrates diagrammatically means connecting the two cells 24, 25 when the latter are photoconductive cells. One electrode of each of the two cells 24. 25 is connected with a common terminal $a$ showing a difference in voltage with ground. The other electrode of each of said two cells is grounded through the agency of a resistance R. The two resistances R have the same value. Furthermore, the grounded electrodes of the cells 24, 25 are connected with each other through the primary winding 26 of a transformer 27. Said wiring diagram constitutes a bridge of which two arms are formed by the photoconductive cells 24, 25, the two other arms being formed by the resistances R. Since the light defining the distance of the object is modulated by reason of the modulation of the beam produced by the projector, the cells 24, 25 supply a variable electrical magnitude showing a component the modulation of which corresponds to that of the projector. Consequently, the primary 26 is fed by an alternating current whenever the two cells 24, 25 do not receive the same amount of modulated light and this produces an output voltage across the terminals of the secondary 28 of the transformer 27. Said output voltage serves for starting the motor 3 in the direction required for shifting the member 6 with the two cones 22, 23 until the line separating the latter registers with the annular illumination produced by the rays reflected by the reflecting surface 20. The direction along which the motor 3 is to be driven is detected readily by comparing the phase of the current supplied by the secondary 28 with the modulation of the projector beam.

Obviously, the two cells 24, 25 can receive luminous rays other than those produced by the bulb 15, but since said other rays are not modulated, they cannot produce any induced alternating voltage in the secondary 28 of the transformer 27.

However, an error may occur if a comparatively important difference in illumination due to parasitic rays arises between the two cells. To reduce such an effect and to increase the accuracy of the telemeter, it is of interest to provide a luminous source inside the casing 1, so as to produce an unvarying comparatively important illumination for said cells. Thus, the characteristic properties of both cells are practically similar for the modulated rays they receive.

In FIG. 1, said auxiliary source of light is constituted by a bulb 29 carried inside a small casing 30 opening towards the cylindrical surface 21 formed on the cones 22 and 23. Thus, both cells 24 and 25 receive a continuous luminous component of an intensity which is much larger than that of any external parasitic rays liable to alter the accuracy of the measurements. The action of such parasitic rays becomes consequently quite negligible.

FIG. 3 illustrates a modification according to which the bulb 15 supplies a beam of parallel rays as provided by the reflector 12, the rays returning after reflection by the body being collected by the reflecting surface 31 which causes them to converge onto the optical axis 18. The point of convergence for the rays, when perfectly parallel, is designated by Q.

The rays reflected by the reflecting surface 31 may be cut off by a circular rearwardly facing mirror 32 located between the two cells 34 and 35. If the convergence of the reflected rays is larger than that illustrated in the drawing for the focus Q, the reflected rays are cut off by the mirror 32 and are sent back onto the cell 35. If, in contradistinction, the convergence of the rays is less, the totality of the latter reaches the cell 34 without being cut off by the mirror 32. It is therefore possible to shift the mirror 32 and to bring it into a position such that the two cells 34 and 35 are equally illuminated, which allows defining the distance of the object as a function of the position occupied by the mirror 32 corresponding to equal illumination of the two cells 34 and 35.

It is well-known in the art that the sources of light are never perfectly pinpoints and consequently it is not possible in practice to obtain, with the projector described, a beam with perfectly parallel rays. Consequently, the reflector 12 forms on the object an image of the luminous source or bulb 15, said image being generally blurred because it is not focused. If it is desired to obtain an excellent accuracy with the arrangement described, it is an easy matter to provide a mechanical coupling between the member 6 and the bulb 15 or the reflector 12. Thus, at the beginning of the measurement, when the luminous image is blurred, the conjugated image of the latter is formed by an annular blurred luminous line on the cylindrical surface 21. However, said blurred line is sufficiently spaced with reference to the line separating the cones 22 and 23 for a sufficient difference in illumination to be obtained between the cells 24 and 25, so that the motor 3 is driven into rotation in the direction urging said separating line towards the annular luminous line.

While said displacement is being produced, the motor 3 also adjusts the distance between the bulb 15 and the reflector 12, which ensures the accurate focusing of the conjugated image of the bulb 15 for a distance equal to the that corresponding to the actual position of the member 6. Thus, as the member 6 moves nearer the position corresponding to the distance to be measured, the focusing of the image of the bulb 15 on the object is improved and when the member 6 reaches this position corresponding to the actual distance, the focusing is excellent. Thus, the rays collected by the element 19 form on the surface 21 a clean luminous line which registers with the line of separation between the cones 22 and 23. The apparatus ensures in this manner a very high accuracy.

It should be noted that the telemeter described may be subjected to various modifications within the scope of the accompanying claims. In particular, the reflecting surfaces or mirrors may be replaced by lenticular systems.

It is not essential for the projector and the optical receiver to be coaxial, since the telemeter may still operate normally in the case where the optical axes of the projector and of the optical receiver are slightly shifted transversely with reference to each other, in principle by a distance less than the diameter of the luminous spot produced on the object of which it is desired to ascertain the distance.

We claim:

1. A telemeter, useful in measuring distances to an object, chiefly for photographic purposes, comprising projector means arranged to transmit a beam of substantially parallel rays of light to the object the distance of which is to be measured, a convergent optical receiving system arranged to receive a reflected beam from the object and the axis of said system being disposed in substantially parallel relationship with the axis of said projector means, means sensitive to the location of the point at which the rays of light of the reflected beam passing out of said optical system converge on the axis of said optical system, and said projector means comprising a reflector positioned forwardly of said optical receiving system in the direction of the object to be measured, said reflector having a concave face directed toward the object, a substantially pinpoint source of light located at the focus of said reflector, said optical receiving system comprising an annular convergent lens forming member coaxial with said reflector and having its outer diameter larger than the diameter of said reflector, two rearwardly flaring cones of transparent material nested one within the other, said cones being coaxial with said lens-forming member and the rearwardly facing surface of said cones forming a cylindrical surface coaxial with said cones, and means for directing the rays of light of the reflected beam passing through said lens-forming member onto said cylindrical surface for passage through said cones to the apices thereof, and said sensitive means comprising a pair of closely spaced photocells adjacent the apices of said cones to be illuminated by the rays of light of the convergent beam to an extent varying with the location of the point of convergency with said optical axis.

2. A telemeter, useful in measuring distances to an object, chiefly for photographic purposes, comprising projector means for transmitting a beam of substantially parallel rays of light to the object the distance of which is to be measured, a convergent optical receiving system having an optical axis in substantially parallel relationship with the axis of said projector means and arranged to receive a reflected beam from the object being measured, said optical system arranged to converge the reflected beam received from the object, photoelectric means arranged for receiving the reflected beam from said optical system, wherein the improvement comprises said photoelectric means comprising at least two sensitive portions spaced with respect to the locus of the possible convergence of the reflected beam, said optical system comprising annular convergent lens-forming means arranged concentrically about the optical axis of said optical system for collecting the rays of the reflected beam and for directing the reflected beam to said photoelectric means, separator means disposed between said annular convergent lens-forming means and said photoelectric means for separating the reflected beam into two portions with each portion being directed to a different one of said sensitive portions of said photoelectric means, a drive member for displacing said photoelectric means within the range of possible locations of convergence of the reflected beam, and means interconnecting said drive member and photoelectric means for actuating said drive member when said sensitive portions of said photoelectric means are receiving unequal intensities of light from the reflected beam for positioning said photoelectric means until it receives equal intensities of light from the reflected beam.

3. A telemeter, as set forth in claim 2, wherein said sensitive portions of photoelectric means comprises a pair of spaced photoelectric cells each exposed to a different one of the two portions of the reflected beam received from said optical receiving system after its division by said separator means.

4. A telemeter as set forth in claim 2 wherein said sensitive portions of said photoelectric means comprising a pair of closely spaced photocells arranged on the axis of said optical system for receiving separate rays of light from the reflected beam to a varying extent, and said means interconnecting said drive member and photoelectric device comprising an electric circuit fed differentially by said photocells according to the location of the point of convergence of the reflected beam on the optical axis and consequently to the distance to be measured, and means for modulating the reflected beam passing through said optical system, and an auxiliary source of light arranged to produce a permanent illumination of said photocells.

5. A range finder for measuring the distance to an object, particularly for use in photography, comprising a projector means for directing a narrow light beam to an object whose distance is to be measured, and a convergent optical receiving system capable of forming an image of the portion of the object lighted by the light beam with the image formed by said convergent optical system being shifted parallel to itself along the optical axis of said optical system in dependence on the distance of the object, wherein the improvement comprises a detector device capable of being displaced along the optical axis, said detector device comprising a separator element for separating the luminous flux forming the image into two separate beams with the proportion of the luminous fluxes forming the two beams being dependent on the position of said separator element with respect to that of the image, said optical system comprising convergent lens-forming means arranged concentrically about the optical axis of said optical system for collecting the luminous flux reflected from the object and for directing the luminous flux to said separator element, photoelectric means designed to measure and compare the intensity of the luminous fluxes of the two beams, and means in operative communication with said photoelectric means for displacing said detector device along the optical axis for bringing said detector device into the position for which the ratio of the two luminous fluxes measured by said photoelectric means assumes a given value.

6. A telemeter, useful in measuring distances to an object, chiefly for photographic purposes, comprising projector means for transmitting a beam of substantially parallel rays of light to the object the distance of which is to be measured, a convergent optical receiving system having an optical axis in substantially parallel relationship with the axis of said projector means and arranged to receive a reflected beam from the object being measured, said optical system arranged to converge the reflected beam received from the object, photoelectric means arranged for receiving the reflected beam from said optical system, wherein the improvement comprises said photoelectric means comprising at least two sensitive portions spaced with respect to the locus of the possible convergence of the reflected beam, said optical system comprising a concave mirror reflecting surface arranged coaxially with the optical axis of said optical system for collecting the rays of the reflected beam and for directing the reflected beam to said photoelectric means, separator means disposed between said reflecting surface and said photoelectric means for separating the reflected beam into two portions with each portion being directed to a different one of said sensitive portions of said photoelectric means, a drive member for displacing said photoelectric means within the range of possible locations of convergence of the reflected beam, and means interconnecting said drive member and photoelectric means for actuating said drive member when said sensitive portions of said photoelectric means are receiving unequal intensities of light from the reflected beam for positioning said photoelectric means until it receives equal intensities of light from the reflected beam.

7. A range finder for measuring the distance to an object, particularly for use in photography, comprising a projector means for directing a narrow light beam to an object whose distance is to be measured, a convergent optical receiving system capable of forming an image of the portion of the object lighted by the light beam, and detector means displaceable along the optical axis of said convergent optical receiving system, wherein the improvement comprises said convergent optical receiving system including optical means arranged to form a substantially plane linear image of the portion of the object lighted by the light beam, said detector means comprises a separator element movable with said detector means along the optical axis of said convergent optical receiving system to keep substantial coincidence with the surface generated by the linear image when the distance of the object to be measured is varied within the useful range of the range finder, said separator element separating the l luminous flux forming the image into two separate beams with the proportion of the luminous fluxes forming the two beams being dependent on the position of said separator element with respect to that of the image and said detector means comprises photoelectric means designed to measure and compare the intensity of the luminous fluxes of the two beams.

8. A range finder, according to claim 7, wherein the substantially plane linear image formed by said optical means in said convergent optical receiving system provides a generated surface which is substantially a cylindrical surface whose generating lines are parallel to the optical axis of said convergent optical receiving system when the distance of the object to be measured is varied with the useful range of the range finder.

9. A range finder according to claim 8 wherein said optical means in said convergent optical receiving system comprise an annular convergent lens-forming member and a frustoconical annular mirror member, with both said members being coaxial.

10. In a range finder for measuring the distance to an object, particularly for use in photography, comprising a projector means for directing a narrow light beam to an object whose distance is to be measured, the improvement comprising, in combination, an optical receiving system forming a substantially plane linear image of the portion of the object lighted by the light beam, this image being in the form of symmetrical arc portions of a circle centered on the optical axis of said optical receiving system, a detector device comprising separator means displaceable along said optical axis to a position where said separator means coincide with symmetrical parts of the linear image, said separator means separating the luminous fluxes forming each of the symmetrical parts of the linear image into two separate beams and said detector system comprising photoelectric means designed to measure and compare the intensity of the luminous fluxes of the two separate beams.